United States Patent
S et al.

(10) Patent No.: US 11,558,477 B1
(45) Date of Patent: Jan. 17, 2023

(54) INTELLIGENT ASYNCHRONOUS DATA EXCHANGE ACROSS MICROSERVICES IN A DISTRIBUTED ENVIRONMENT

(71) Applicant: SAP SE, Walldorf (DE)

(72) Inventors: Anbusivam S, Bangalore (IN); Sundaresan Krishnamurthy, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/744,896

(22) Filed: May 16, 2022

(51) Int. Cl.
*H04L 67/51* (2022.01)
*H04L 51/21* (2022.01)
*H04L 41/084* (2022.01)
*H04L 67/1001* (2022.01)

(52) U.S. Cl.
CPC .......... *H04L 67/51* (2022.05); *H04L 41/084* (2013.01); *H04L 51/21* (2022.05); *H04L 67/10015* (2022.05)

(58) Field of Classification Search
CPC ....... H04L 67/51; H04L 41/084; H04L 51/21; H04L 67/10015
See application file for complete search history.

(56) References Cited

U.S. PATENT DOCUMENTS

| | | | |
|---|---|---|---|
| 2021/0306429 A1* | 9/2021 | Jonas | H04L 67/562 |
| 2022/0214862 A1* | 7/2022 | Scarfutti | G06Q 10/06316 |
| 2022/0217211 A1* | 7/2022 | Scarfutti | G06F 16/9024 |
| 2022/0253347 A1* | 8/2022 | Jones | G06F 9/542 |

* cited by examiner

*Primary Examiner* — Benjamin M Thieu
(74) *Attorney, Agent, or Firm* — Schwegman Lundberg & Woessner, P.A.

(57) ABSTRACT

In an example embodiment, a specialized architecture is utilized in conjunction with a message broker to enable asynchronous communications. The specialized architecture provides central components within each data center to enable the communication, and also is able to segregate functionality across different microservice landscapes. A message broker alone may not be sharable across data centers for various technical reasons, such as security concerns, latency, or other technical constraints. Topic names may be utilized by the message broker to ensure delivery of the message to the correct microservice in the other data center.

20 Claims, 6 Drawing Sheets

INTELLIGENT ASYNCHRONOUS DATA EXCHANGE ACROSS MICROSERVICES IN A DISTRIBUTED ENVIRONMENT

TECHNICAL FIELD

This document generally relates to microservice software environments. More specifically, this document relates to intelligent asynchronous data exchange across microservices in a distributed environment.

BACKGROUND

Microservices are small, independent software processes that can be written in multiple languages. An infrastructure designed for these modular components is known as a microservices environment or microservices architecture. Cloud environments may be used to implement microservices environments. An example of a microservices environment is SAP Cloud Platform® Extension Manager, from SAP SE of Walldorf, Germany.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Microservices are often deployed in data centers. A data center is a dedicated location used to house computer systems and associated components. When microservices in the same data center wish to communicate to each other, they can send synchronous messages to each other, such as by using Hypertext Transfer Protocol (HTTP) and sending the messages directly to one another (point-to-point communication). Such direct communications, however, will lead to excessive latencies if utilized across data centers, especially when the data centers are geographically remote from one another.

In an example embodiment, a specialized architecture is utilized in conjunction with a message broker to enable asynchronous communications. The specialized architecture provides central components within each data center to enable the communication, and also is able to segregate functionality across different microservice landscapes. A message broker alone may not be sharable across data centers for various technical reasons, such as security concerns, latency, or other technical constraints. Topic names may be utilized by the message broker to ensure delivery of the message to the correct microservice in the other data center.

Figure 1:
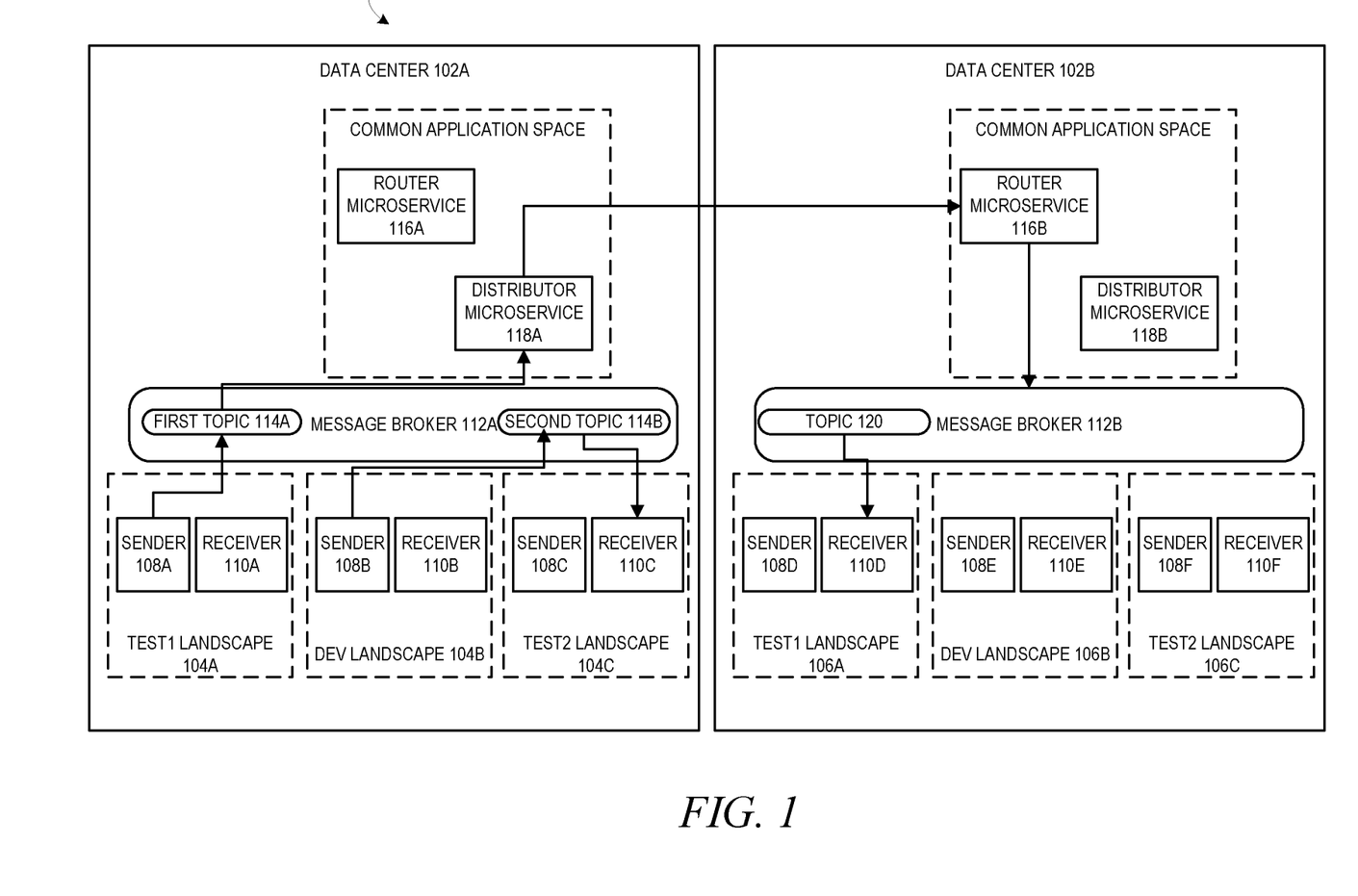
FIG. 1 is a block diagram illustrating a system in accordance with an example embodiment.

FIG. 1 is a block diagram illustrating a system 100 in accordance with an example embodiment. Here, two distributed data centers 102A, 102B are provided. These distributed data centers 102A, 102B can either be physically distinct data centers (e.g., located geographically apart from one another) or logically distinct data centers (e.g., not necessarily located geographically apart from one another). While the presently described techniques can be applied to either type of data center distribution mechanism, many of the technical advantages of the presently described techniques apply mostly to data centers located geographically apart from one another by a significant distance.

Each data center 102A, 102B contains a plurality of landscapes 104A, 104B, 104C and 106A, 106B, 106C, respectively. Each landscape 104A, 104B, 104C, 106A, 106B, 106C may be a grouping of microservices, some of which perform actions involving sending messages (such as sender 108A, 108B, 108C, 108D, 108E, 108F) and some of which perform actions involving receiving messages (such as receiver 110A, 110B, 110C, 110D, 110E, 110F).

In an example embodiment, each sender 108A, 108B, 108C, 108D, 108E, 108F prior to sending a message to a corresponding message broker 112A, 112B within the same data center 102A, 102B, accesses a local library of functions that has been modified so as to cause the sender 108A, 108B, 108C, 108D, 108E, 108F to first determine whether the recipient of the message is located on the same data center or a different data center, and to post the message to a topic in the message broker 112A, 112B that corresponds to that determination. Thus, for example, depicted in message broker 112A are a first topic 114A, corresponding to a topic that is distributed to only microservices within the data center 102A, and a second topic 114B, corresponding to a topic that is distributed to only microservices in other data center(s), such as data center 102B.

Additionally, in an example embodiment, each data center 102A, 102B also includes a router microservice 116A, 116B and a distributor microservice 118A, 118B. The distributor microservice 118A, 118B listens for messages posted to a topic in the corresponding message broker 112A, 112B that corresponds to a topic that is distributed to only microservices in other data centers. When a message is posted to such a topic, it then transmits that message to a corresponding router microservice 116A, 116B on the other data center(s) 102A, 102B. The job of the router microservice 116A, 116B is then to post the message to the corresponding message broker 112A, 112B, where a subscribing receiver 110A, 110B, 110C, 110D, 110E, 110F can listen for it and then get it.

Thus, for example, if sender 108A in landscape 104A of data center 102A generates a message intended for a landscape on another data center, such as landscape 106A of data center 102B, its local library informs it that it should post it to second topic 114B of message broker 112A. Distributor microservice 118A monitors second topic 114B of message broker 112A, and when the message is posted, distributor microservice 118A transmits it (such as via HTTP) to router microservice 116B on data center 102B. Router microservice 116B then posts the message in a topic 120 on message broker 112B that corresponds to topics associated with other data centers. Receiver 110D in landscape 106A of data center 102B then receives the message as it subscribes to topic 120.

Each topic is a logical unit that groups similar kinds of messages based on functionality. For example, when two applications exchange information such as sales orders, a topic name could be "sales order". In an example embodiment, such topics will be split into different topic names, according to whether the corresponding messages are intended to microservices in the same data center or another data center. For example, rather than a single "sales order" topic, there may be one topic name "sales order-local dc" for local messages and another topic name "sales order-other dcs" for non-local messages. The distributor in the data center may monitor the "sales order-other dcs" topic and forward any messages posted to it to a router on another data center.

Since the message broker transactions are asynchronous, the result is that asynchronous communication can be achieved over distributed data centers despite using protocols typically used for synchronous communications, such as HTTP.

In a further example embodiment, the topic names utilized do more than distinguish between topics for local consumption (messages within the same data center) or non-local consumption (messages between different data centers). Specifically, they may further segregate based on use case or similar functionality. In this way, a microservice need not use a "real" topic name but instead could use the use case name. This is useful in situations where the microservice may not be aware of an actual topic name, or is aware of the topic name used on its own data center but a similar topic on another data center has a different name. A reusable utility may be used to derive the actual topic name based on a combination of the specified use-case, landscape, and data center. In some example embodiments, the actual topic name may be derived further based on a combination of the use-case, landscape, data center, and purpose.

In an example embodiment, a landscape configuration may be utilized to map between various pieces of information used to enable the message broker and topics as described above. Specifically, the mapping may include a list of logical data center names (e.g., dc1, dc2, etc.), a list of landscape names (e.g., dev, test, prod, etc.) for each logical data center name, an actual location of reusable components such as the router and the distributor, an actual location of where the sender application resides for the data center, an actual location of where the receiver application resides (unless in the same location as the sender), and a destination name to reach the router which is responsible for the landscape in the data center. Notably, the location of the reusable components may be called a space name and may be stored under the hierarchy global-account→sub-account-→space.

In an example embodiment, the destination configuration information, such as uniform resource locator (URL), user credentials or certificates, required headers, etc. may be stored in a separate secure store. If it is already secured, however, it may be stored in the same configuration as the landscape configuration.

Below is an example of a landscape configuration in Yet Another Markup Language (YAML) format, in accordance with an example embodiment. Ingress-space denotes the common application where components such as router, distributor, and message broker instance exist.

i. datacenters:
   1. dc1:
     a. landscapes: #space
       i. dev:
          1. ingress-space: dev-ingress-dc1
          2. destination: ds_dc1_dev
          3. usecase-space: devloc1
       ii. test:
          1. ingress-space: test-ingress-dc1
          2. destination: ds_dc1_test
          3. usecase-space: testloc1
       iii. prod:
          1. ingress-space: prod-ingress-dc1
          2. destination: ds_dc1_prod
          3. usecase-space: prodloc1
   2. dc2:
     a. landscapes: #space
       i. dev:
          1. ingress-space: dev-ingress-dc2
          2. destination: ds_dc2_dev
          3. usecase-space: devloc2
       ii. test:
          1. ingress-space: test-ingress-dc2
          2. destination: ds_dc2_test
          3. usecase-space: testloc2
       iii. prod:
          1. ingress-space: prod-ingress-dc2
          2. destination: ds_dc2_prod
          3. usecase-space: prodloc2

In the above configuration, destination is represented only as a name. For each destination name, various other details to access the destination, such as URL, user, password or certificates, headers, etc. could be stored in a separate or same configuration store. Furthermore, optionally there may be a list of use case names, and information specific to the use cases may be stored in the configuration.

In order to set up a message flow between a sender microservice and a receiver microservice, first it is determined what the use case name was that the receiver microservice(s) listened to. A logic may be present to determine which data center each message in the message flow needs to be sent to.

If the receiver microservice is not in the same data center as the sender microservice, then a topic name is created with a combination of a constant identifier (to denote it is intended for a distributor to pick up), a data center name, a location of a sender application or landscape name (with space name, landscape name could be derived from the landscape configuration), and optionally a use case name. In some cases, having fewer numbers of topics increases the efficiency of the distributor, and thus in that case the use case name can be used in the message header instead of the topic name. An example topic name is as follows "template ds.<space>.<targetdatacenter>. Here ds denotes that the distributor should pick this up.

If the receiver microservice is in the same data center as the sender microservice, then a topic name is created with a combination of a constant identifier (to denote that it is intended for the receiver microservice to pick up), a location of a sender application or landscape name, and a use case name. An example topic name is as follows "template ms.<space>.<usecase>. Here ms denotes that it is meant for the receiver microservice to pick up.

The distributor derives the list of topics by listening to the message broker and obtaining the list of data centers, use cases, and space names from the landscape configuration. From the message, the target data center, use case, and location are obtained. The location may be used to derive the landscape from the landscape configuration.

The distributor then gets the destination for the use case location, landscape, and data center from the landscape configuration. It then calls the URL in the destination, using details such as use case, landscape, and target data center. It finally reaches the router in the receiver's data center.

The router receives a request and interprets details such as use case, landscape, target data center, etc., which can be part of the call in some way, such as in the header, body, URL path, or query parameters. The logic at the router is the same as of a sender microservice. Namely, if it is located in the target data center, then it writes to a topic which is similar to the sender logic in its topic name (ms.<space>.<usecase>). If it is not in the current data center, it writes it to the topic name using the sender logic (ds.<space>.<usecase>). Based on the topic name, either a microservice in the data center or the distributor in the data center will pick it up.

The receiver microservice listens to a topic name based on a combination of use case, use case location (which is the current receiver's location), and a constant indicating the receiver microservice is a recipient. As the receiver microservice can get the use case space from the environment, it need not typically read the landscape configuration.

Figure 2:
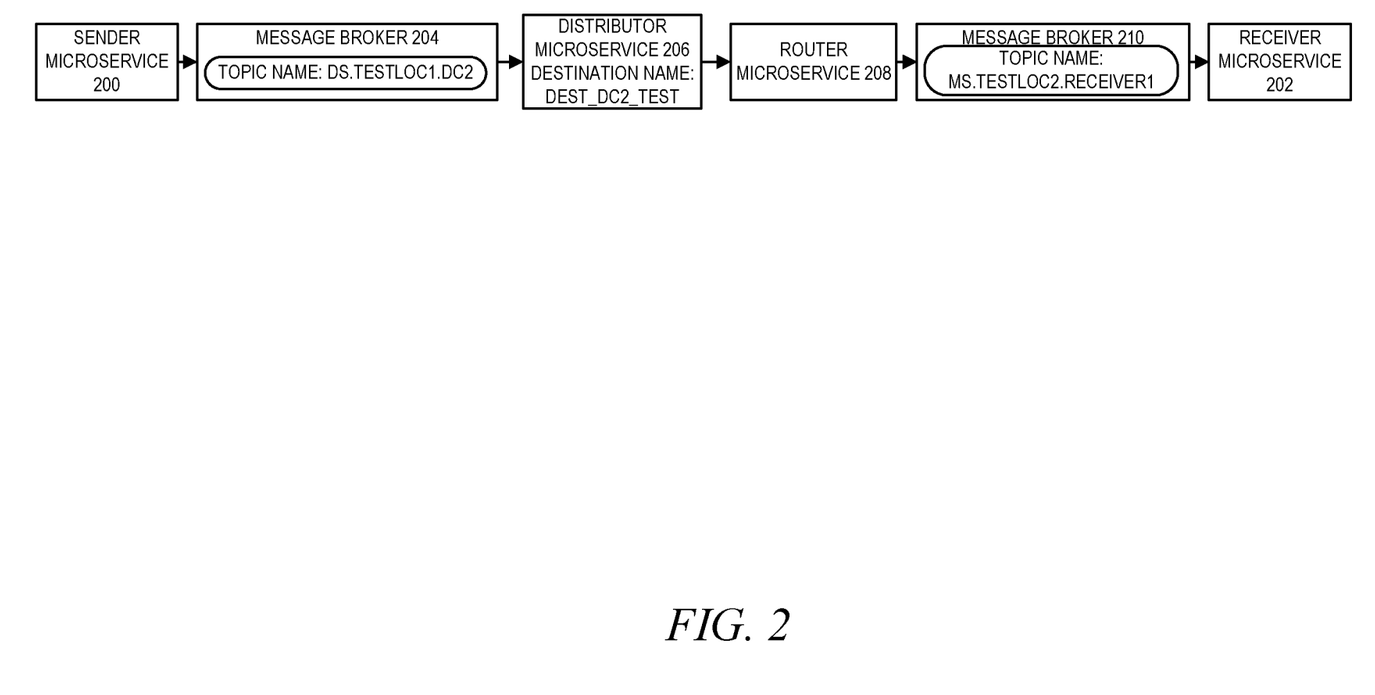
FIG. 2 is a diagram illustrating an example message flow between microservices in different data centers, in accordance with an example embodiment.

FIG. 2 is a diagram illustrating an example message flow between microservices in different data centers, in accordance with an example embodiment. Here, the landscape involved may be the test landscape and the sender microservice 200 may have a use case name of "caana" with use case location of "testloc1," while the receiver microservice 202 may have a use case name of "metext" with use case location of "testloc2". The sender microservice 200 posts the message on the message broker 204 of its local data center using topic name "ds.testloc1.dc2," with "ds" indicating the message is intended for a non-local data center, "testloc1" indicating the sender's landscape location, and "dc2" indicating the intended recipient data center of the message. The message may also, of course, include data intended for the receiver microservice 202 in the body of the message.

The distributor microservice 206, located in the same data center as the sender microservice 200, may pick up the message because of the "ds" prefix in the topic name, and then may determine from the landscape configuration that the destination name is "dest_dc2_test." It then forwards the message to router microservice 208 located in the same data center as the receiver microservice 202. Router microservice 208 posts the message to message broker 210 located in the same data center as the receiver microservice 202, using the topic name "ms.testloc2.receiver2," with "ms" indicating the message is intended for this data center, "testloc2" indicating the receiver's landscape location, and "receiver1" being an identifier of the specific receiver microservice 202 to whom the message is intended.

The receiver microservice 202 is subscribed to that topic name with the message broker 210, and thus when the message is posted there, the receiver microservice 202 is able to receive it.

Figure 3:
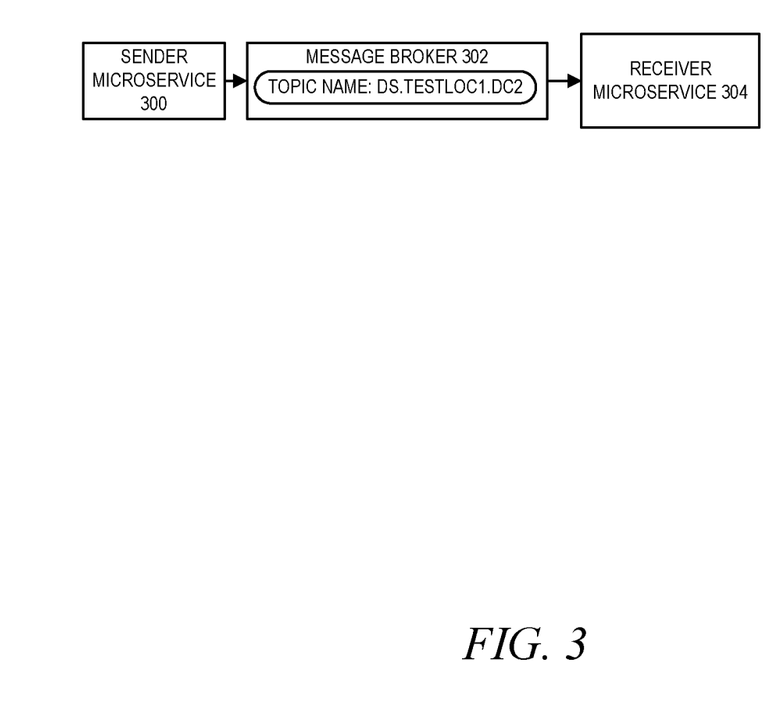
FIG. 3 is a diagram illustrating an example message flow between microservices in the same data center, in accordance with an example embodiment.

FIG. 3 is a diagram illustrating an example message flow between microservices in the same data center, in accordance with an example embodiment. Here, the landscape involved may be the test landscape (with use case location testloc1) in the data center. Sender microservice 300 posts the message to message broker 302 using the topic "ms.testloc1.receiver1." Since this topic has the prefix "ms" rather than "ds", the distributor (not pictured) in this data center will not pick up the message, and instead the message broker 302 delivers it directly to subscribing receiver microservice 304.

With the above logic, even if the landscape names are different between data centers, even if there are multiple landscapes within a data center, and even if there are multiple microservices, the system is able to clearly send data from one microservice to the correct microservice(s) in the same or different data centers.

Figure 4:
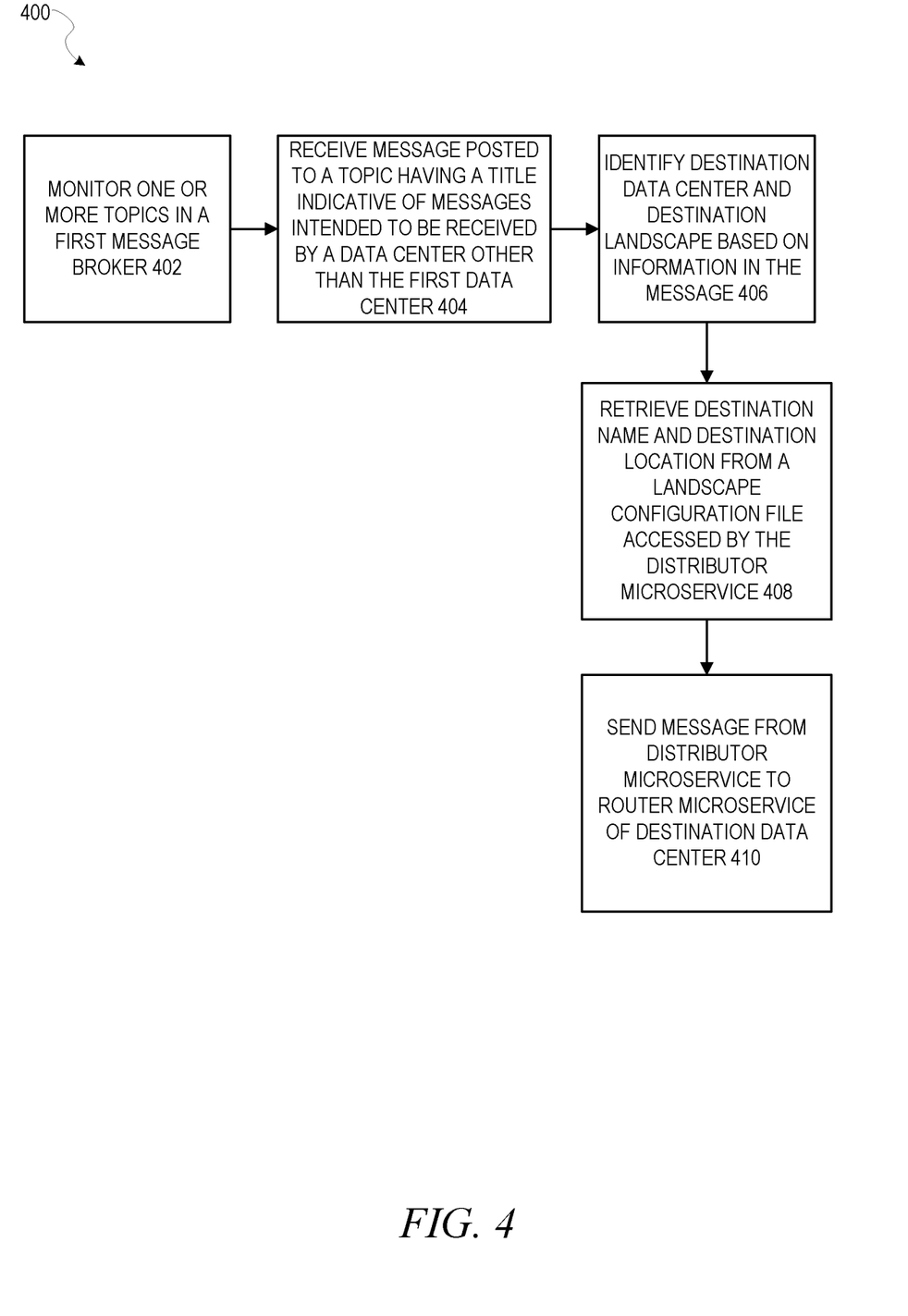
FIG. 4 is a flow diagram illustrating a method of sending messages between data centers, in accordance with an example embodiment.

FIG. 4 is a flow diagram illustrating a method 400 of sending messages between data centers, in accordance with an example embodiment. At operation 402, a distributor microservice in a first data center monitors one or more topics of a first message broker. Some of these topics may have titles indicative of messages intended to be received by a data center other than the first data center (e.g., a first piece of predetermined text used as a prefix of a topic name), while some of the topics may have titles indicative of messages intended to be received within the first data center (e.g., a second piece of predetermined text used as a prefix of a topic name).

At operation 404, a message posted to a topic having a title indicative of messages intended to be received by a data center other than the first data center is received. In response to this, at operation 406, a destination data center and destination landscape are identified based on information in the message. The destination data center may be explicitly specified in the message, whereas the destination landscape may either be explicitly specified in the message or derived using other information, such as by accessing a landscape configuration file using the destination data center and a sender landscape identified in a name of the topic.

At operation 408, a destination name and destination location are retrieved from a landscape configuration file accessed by the distributor microservice, using the destination data center and destination landscape. At operation 410, the message is sent from the distributor microservice to a router microservice of the destination data center, using the retrieved destination name and destination location. The router microservice is configured to post the message to a second topic in a message broker of the destination data center. Since method 400 is from the perspective of the distributor microservice, this final step is not explicitly recited in the figure.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
monitoring, at a distributor microservice in a first data center, one or more topics of a first message broker, the one or more topics having titles indicative of messages intended to be received by a data center other than the first data center;

upon detection at the distributor microservice of a message posted at the first message broker by a first sender microservice to a first topic of the one or more topics:
identifying, based on information in the message, a destination data center and destination landscape;
retrieving a destination name and destination location from a landscape configuration file accessed by the distributor microservice, using the destination data center and destination landscape; and
sending the message from the distributor microservice to a router microservice of the destination data center, using the retrieved destination name and destination location, the router microservice configured to post the message to a second topic in a message broker of the destination data center.

Example 2. The system of Example 1, wherein the destination landscape is derived from the landscape configuration file using the destination data center and a sender landscape identified in a name of the first topic.

Example 3. The system of Examples 1 or 2, wherein the titles indicative of messages intended to be received by a data center other than the first data center include a predefined piece of text in the titles.

Example 4. The system of any of Examples 1-3, wherein the message further includes a use case, and wherein the operations further comprise:
retrieving a use case location from the landscape configuration file using the use case location; and
wherein the router microservice is further configured to determine a receiver use case location using a second landscape configuration file accessed by the router microservice and wherein the second topic includes the receiver use case location in its name.

Example 5. The system of any of Examples 1-4, wherein the first message broker further receives an additional message posted to a topic having a title indicative of messages intended to be received by the first data center and, in response to receiving the additional message, sends the additional message within the first data center to a second receiver microservice.

Example 6. The system of Example 5, wherein the topic having a title indicative of messages intended to be received by the first data center includes a second predefined piece of text in its title.

Example 7. The system of any of Examples 1-6, wherein the first sender microservice posts the message to a topic of the first message broker having a title with a predefined prefix indicating the message is intended for a data center other than the first data center, a sender use case location, and a receiver data center in it.

Example 8. A method comprising:
monitoring, at a distributor microservice in a first data center, one or more topics of a first message broker, the one or more topics having titles indicative of messages intended to be received by a data center other than the first data center;
upon detection at the distributor microservice of a message posted at the first message broker by a first sender microservice to a first topic of the one or more topics:
identifying, based on information in the message, a destination data center and destination landscape;
retrieving a destination name and destination location from a landscape configuration file accessed by the distributor microservice, using the destination data center and destination landscape; and
sending the message from the distributor microservice to a router microservice of the destination data center, using the retrieved destination name and destination location, the router microservice configured to post the message to a second topic in a message broker of the destination data center.

Example 9. The method of Example 8, wherein the destination landscape is derived from the landscape configuration file using the destination data center and a sender landscape identified in a name of the first topic.

Example 10. The method of Examples 8 or 9, wherein the titles indicative of messages intended to be received by a data center other than the first data center include a predefined piece of text in the titles.

Example 11. The method of any of Examples 8-10, wherein the message further includes a use case, and wherein the method further comprises:
retrieving a use case location from the landscape configuration file using the use case location; and
wherein the router microservice is further configured to determine a receiver use case location using a second landscape configuration file accessed by the router microservice and wherein the second topic includes the receiver use case location in its name.

Example 12. The method of any of Examples 8-11, wherein the first message broker further receives an additional message posted to a topic having a title indicative of messages intended to be received by the first data center and, in response to receiving the additional message, sends the additional message within the first data center to a second receiver microservice.

Example 13. The method of Example 12, wherein the topic having a title indicative of messages intended to be received by the first data center includes a second predefined piece of text in its title.

Example 14. The method of any of Examples 8-13, wherein the first sender microservice posts the message to a topic of the first message broker having a title with a predefined prefix indicating the message is intended for a data center other than the first data center, a sender use case location, and a receiver data center in it.

Example 15. A non-transitory machine-readable medium storing instructions which, when executed by one or more processors, cause the one or more processors to perform operations comprising:
monitoring, at a distributor microservice in a first data center, one or more topics of a first message broker, the one or more topics having titles indicative of messages intended to be received by a data center other than the first data center;
upon detection at the distributor microservice of a message posted at the first message broker by a first sender microservice to a first topic of the one or more topics:
identifying, based on information in the message, a destination data center and destination landscape;
retrieving a destination name and destination location from a landscape configuration file accessed by the distributor microservice, using the destination data center and destination landscape; and
sending the message from the distributor microservice to a router microservice of the destination data center, using the retrieved destination name and destination location, the router microservice configured to post the message to a second topic in a message broker of the destination data center.

Example 16. The non-transitory machine-readable medium of Example 15, wherein the destination landscape is derived from the landscape configuration file using the destination data center and a sender landscape identified in a name of the first topic.

Example 17. The non-transitory machine-readable medium of Examples 15 or 16, wherein the titles indicative of messages intended to be received by a data center other than the first data center include a predefined piece of text in the titles.

Example 18. The non-transitory machine-readable medium of any of Examples 15-17, wherein the message further includes a use case, and wherein the operations further comprise:

retrieving a use case location from the landscape configuration file using the use case location; and wherein the router microservice is further configured to determine a receiver use case location using a second landscape configuration file accessed by the router microservice and wherein the second topic includes the receiver use case location in its name.

Example 19. The non-transitory machine-readable medium of any of Examples 15-18, wherein the first message broker further receives an additional message posted to a topic having a title indicative of messages intended to be received by the first data center and, in response to receiving the additional message, sends the additional message within the first data center to a second receiver microservice.

Example 20. The non-transitory machine-readable medium of Example 19, wherein the topic having a title indicative of messages intended to be received by the first data center includes a second predefined piece of text in its title.

Figure 5:
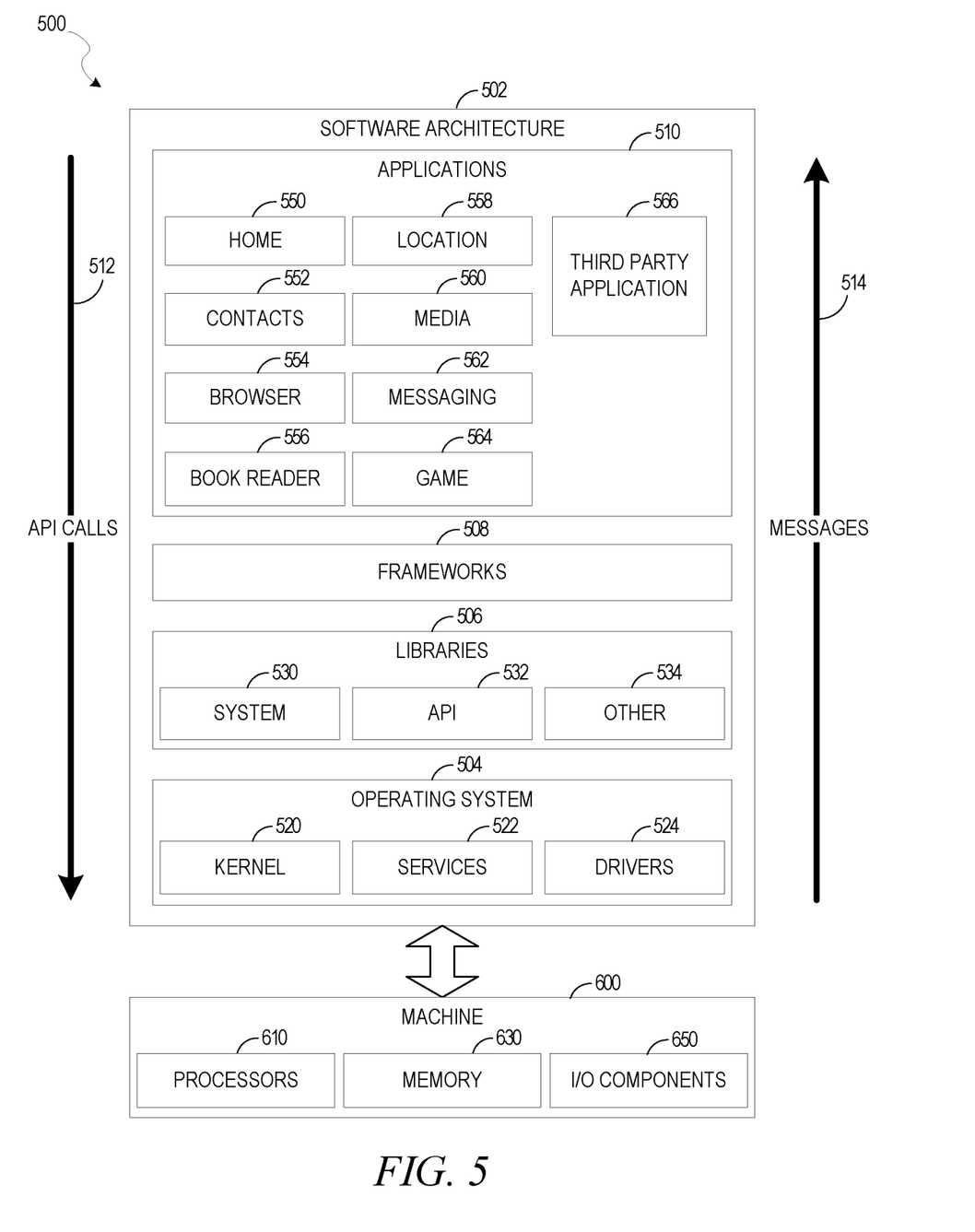
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
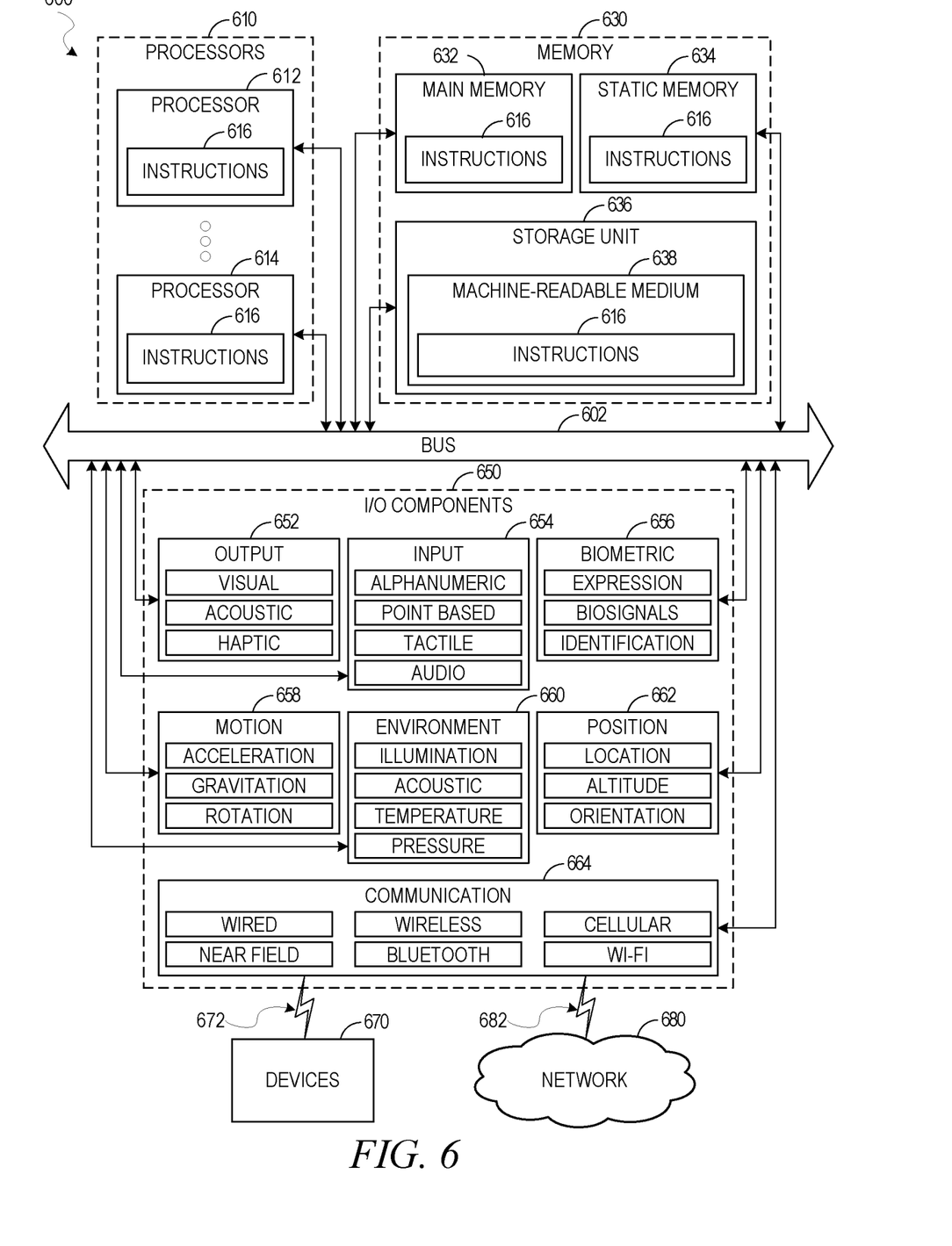
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   monitoring, at a distributor microservice in a first data center, one or more topics of a first message broker, the one or more topics having titles indicative of messages intended to be received by a data center other than the first data center; and
   upon detection at the distributor microservice of a message posted at the first message broker by a first sender microservice to a first topic of the one or more topics:
   identifying, based on information in the message, a destination data center and a destination landscape;
   retrieving a destination name and destination location from a landscape configuration file accessed by the distributor microservice, using the destination data center and destination landscape; and
   sending the message from the distributor microservice to a router microservice of the destination data center, using the retrieved destination name and destination location, the router microservice configured to post the message to a second topic in a message broker of the destination data center.

2. The system of claim 1, wherein the destination landscape is derived from the landscape configuration file using the destination data center and a sender landscape identified in a name of the first topic.

3. The system of claim 1, wherein the titles indicative of messages intended to be received by a data center other than the first data center include a predefined piece of text in the titles.

4. The system of claim 1, wherein the message further includes a use case, and wherein the operations further comprise:
retrieving a use case location from the landscape configuration file using the use case location; and
wherein the router microservice is further configured to determine a receiver use case location using a second landscape configuration file accessed by the router microservice and wherein the second topic includes the receiver use case location in its name.

5. The system of claim 1, wherein the first message broker further receives an additional message posted to a topic having a title indicative of messages intended to be received by the first data center and, in response to receiving the additional message, sends the additional message within the first data center to a second receiver microservice.

6. The system of claim 5, wherein the topic having a title indicative of messages intended to be received by the first data center includes a second predefined piece of text in its title.

7. The system of claim 1, wherein the first sender microservice posts the message to a topic of the first message broker having a title with a predefined prefix indicating the message is intended for a data center other than the first data center, a sender use case location, and a receiver data center in it.

8. A method comprising:
monitoring, at a distributor microservice in a first data center, one or more topics of a first message broker, the one or more topics having titles indicative of messages intended to be received by a data center other than the first data center; and
upon detection at the distributor microservice of a message posted at the first message broker by a first sender microservice to a first topic of the one or more topics:
identifying, based on information in the message, a destination data center and a destination landscape;
retrieving a destination name and destination location from a landscape configuration file accessed by the distributor microservice, using the destination data center and destination landscape; and
sending the message from the distributor microservice to a router microservice of the destination data center, using the retrieved destination name and destination location, the router microservice configured to post the message to a second topic in a message broker of the destination data center.

9. The method of claim 8, wherein the destination landscape is derived from the landscape configuration file using the destination data center and a sender landscape identified in a name of the first topic.

10. The method of claim 8, wherein the titles indicative of messages intended to be received by a data center other than the first data center include a predefined piece of text in the titles.

11. The method of claim 8, wherein the message further includes a use case, and wherein the method further comprises:
retrieving a use case location from the landscape configuration file using the use case location; and
wherein the router microservice is further configured to determine a receiver use case location using a second landscape configuration file accessed by the router microservice and wherein the second topic includes the receiver use case location in its name.

12. The method of claim 8, wherein the first message broker further receives an additional message posted to a topic having a title indicative of messages intended to be received by the first data center and, in response to receiving the additional message, sends the additional message within the first data center to a second receiver microservice.

13. The method of claim 12, wherein the topic having a title indicative of messages intended to be received by the first data center includes a second predefined piece of text in its title.

14. The method of claim 8, wherein the first sender microservice posts the message to a topic of the first message broker having a title with a predefined prefix indicating the message is intended for a data center other than the first data center, a sender use case location, and a receiver data center in it.

15. A non-transitory machine-readable medium storing instructions which, when executed by one or more processors, cause the one or more processors to perform operations comprising:
monitoring, at a distributor microservice in a first data center, one or more topics of a first message broker, the one or more topics having titles indicative of messages intended to be received by a data center other than the first data center; and
upon detection at the distributor microservice of a message posted at the first message broker by a first sender microservice to a first topic of the one or more topics:
identifying, based on information in the message, a destination data center and a destination landscape;
retrieving a destination name and destination location from a landscape configuration file accessed by the distributor microservice, using the destination data center and destination landscape; and
sending the message from the distributor microservice to a router microservice of the destination data center, using the retrieved destination name and destination location, the router microservice configured to post the message to a second topic in a message broker of the destination data center.

16. The non-transitory machine-readable medium of claim 15, wherein the destination landscape is derived from the landscape configuration file using the destination data center and a sender landscape identified in a name of the first topic.

17. The non-transitory machine-readable medium of claim 15, wherein the titles indicative of messages intended to be received by a data center other than the first data center include a predefined piece of text in the titles.

18. The non-transitory machine-readable medium of claim 15, wherein the message further includes a use case, and wherein the operations further comprise:
retrieving a use case location from the landscape configuration file using the use case location; and
wherein the router microservice is further configured to determine a receiver use case location using a second landscape configuration file accessed by the router microservice and wherein the second topic includes the receiver use case location in its name.

19. The non-transitory machine-readable medium of claim 15, wherein the first message broker further receives an additional message posted to a topic having a title indicative of messages intended to be received by the first data center and, in response to receiving the additional message, sends the additional message within the first data center to a second receiver microservice.

20. The non-transitory machine-readable medium of claim 19, wherein the topic having a title indicative of messages intended to be received by the first data center includes a second predefined piece of text in its title.

\* \* \* \* \*